(12) United States Patent
Shirakata et al.

(10) Patent No.: US 10,015,645 B2
(45) Date of Patent: Jul. 3, 2018

(54) CONTENT DELIVERY SYSTEM AND METHOD

(71) Applicant: Panasonic Intellectual Property Corporation of America, Torrance, CA (US)

(72) Inventors: Naganori Shirakata, Kanagawa (JP); Koji Takinami, Kanagawa (JP); Tomoya Urushihara, Kanagawa (JP); Masashi Kobayashi, Tokyo (JP); Kenichi Ono, Hyogo (JP); Noboru Yamamoto, Tokyo (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 15/648,303

(22) Filed: Jul. 12, 2017

(65) Prior Publication Data

US 2018/0027389 A1 Jan. 25, 2018

(30) Foreign Application Priority Data

Jul. 22, 2016 (JP) ................... 2016-144805

(51) Int. Cl.
*H04W 4/06* (2009.01)
*H04L 29/08* (2006.01)
(Continued)

(52) U.S. Cl.
CPC ........... *H04W 4/06* (2013.01); *H04L 67/1097* (2013.01); *H04L 67/12* (2013.01); *H04L 67/42* (2013.01);
(Continued)

(58) Field of Classification Search
CPC ......... H04W 4/06; H04W 4/20; H04W 84/20; H04W 84/005; H04L 67/42; H04L 67/12
See application file for complete search history.

(56) References Cited

U.S. PATENT DOCUMENTS

2004/0077362 A1* 4/2004 Chinomi ............... H04W 76/40
455/456.5
2008/0207200 A1* 8/2008 Fein ........................ H04B 1/38
455/426.1

(Continued)

FOREIGN PATENT DOCUMENTS

JP 2004-140525 A 5/2004

OTHER PUBLICATIONS

Extended European Search Report, dated Dec. 7, 2017, for corresponding European Patent Application 17181807.3-1853, 9 pages.

*Primary Examiner* — Chuong A Ngo
(74) *Attorney, Agent, or Firm* — Seed IP Law Group LLP (57) ABSTRACT

Provided is a content delivery system in which a content delivery server delivers content to a content delivery client. The content delivery client transmits content using first wireless communication, detects the area of second wireless communication, and if it determines that sufficient free space is not present in a first storage thereof, transmits a part of data stored in the first storage to the content delivery server using the second wireless communication. The content delivery server makes free space in the first storage by temporarily storing the data in a second storage thereof and then delivers content using the second wireless communication on the basis of the control information.

8 Claims, 7 Drawing Sheets

(51) Int. Cl.
   *H04L 29/06* (2006.01)
   *H04W 4/20* (2018.01)
   *H04W 84/00* (2009.01)
   *H04W 84/20* (2009.01)

(52) U.S. Cl.
   CPC ............... *H04L 69/14* (2013.01); *H04W 4/20* (2013.01); *H04W 84/005* (2013.01); *H04W 84/20* (2013.01)

(56) References Cited

U.S. PATENT DOCUMENTS

2013/0238751 A1    9/2013   Raleigh et al.
2016/0234303 A1*   8/2016   Liu ....................... H04L 67/104

* cited by examiner

CONTENT DELIVERY SYSTEM AND METHOD

BACKGROUND

1. Technical Field

The present disclosure relates to a content delivery system and method, for example, a content delivery system and method that deliver a great amount of electronic data or moving-image information content to a moving object such as a vehicle at high speed.

2. Description of the Related Art

Among conventional content delivery systems is a system of Japanese Patent No. 4016792. The system of Japanese Patent No. 4016792 has multiple communication areas covered by multiple wireless base stations. In this system, each mobile terminal includes means that when a host delivers information to the mobile terminal, selects/determines a communication system on the basis of the installation density of wireless base stations in the communication area. The means selects divided download when the installation density is high; it selects collective download when the installation density is low. Thus, the system guides the mobile terminal to a place where the mobile terminal can acquire information and then delivers the information thereto.

SUMMARY

In recent years, various types of information content have been made available, including map data and music data as well as high-resolution photograph data, high-resolution moving-image data, three-dimensional map data, and sensing data for automated driving. The volume of such data handled by moving objects such as vehicles has been drastically increased, and the storage capacity of mobile terminals has been increased accordingly. Typically, a user's mobile terminal is storing a large volume of content data and lacking free space. For this reason, for example, each time new content is stored, the user may select and delete unnecessary content to make free space. Also, for example, if a moving object such as a vehicle attempts to receive delivered content, the moving object has many time restrictions in staying within the communication area and therefore is more likely to fail to completely download the content.

One non-limiting and exemplary embodiment provides a system and method that deliver content using a wireless communication network which has a narrow communication area but can perform sufficiently fast communication with respect to the content volume, for example, a network that uses a microwave or millimeter wave. The content delivery system and method upload data temporarily stored in the cache storage of a mobile terminal for content delivery to make free space in the mobile terminal and then download new content in the mobile terminal. Thus, the content delivery system and method reliably complete the delivery of the content and improve user convenience.

A content delivery system of one aspect of the present disclosure is a content delivery system including a content delivery server and a content delivery client. The content delivery client includes a first wireless communication circuitry that performs first wireless communication, a second wireless communication circuitry that performs second wireless communication, and a first storage. The content delivery server includes a third wireless communication circuitry that performs the first wireless communication, a fourth wireless communication circuitry that performs the second wireless communication, and a second storage having a larger capacity than a capacity of the first storage. The content delivery client transmits control information about download of first content to the content delivery server through the first wireless communication circuitry. The content delivery client detects an area of the second wireless communication using the second wireless communication circuitry. If free space of the first storage is smaller than a volume of the first content, the content delivery client uploads second content stored in the first storage to the content delivery server through the second wireless communication circuitry and then downloads the first content. The content delivery server receives the control information about the download of the first content from the content delivery client through the third wireless communication circuitry. The content delivery server detects the area of the second wireless communication using the fourth wireless communication circuitry. When the second content is uploaded from the content delivery client, the content delivery server temporarily stores the second content in the second storage and then downloads the first content to the content delivery client through the fourth wireless communication circuitry.

It should be noted that general or specific embodiments may be implemented as a system, a method, an integrated circuit, a computer program, a storage medium, or any selective combination thereof.

According to the one aspect of the present disclosure, it is possible to reliably complete the delivery of a great volume of content in a network that uses a millimeter wave and to favorably improve user convenience.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Now, embodiments of the present disclosure will be described with reference to the drawings.

First Embodiment

Figure 1:
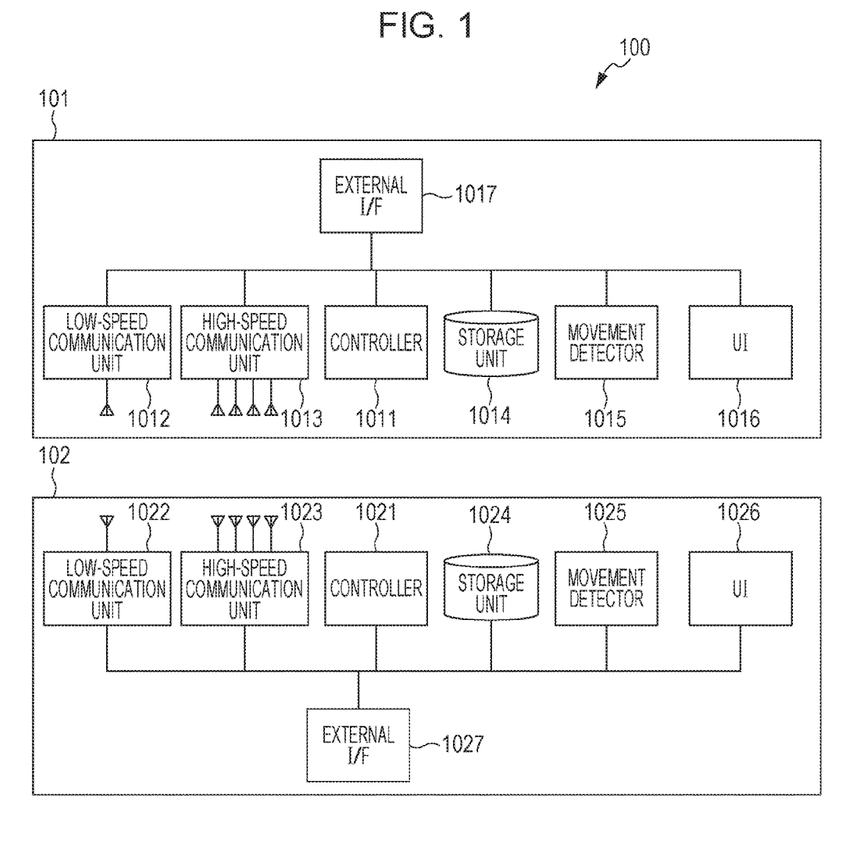
FIG. 1 is a block diagram showing the configuration of a content delivery system of an embodiment of the present disclosure.

FIG. 1 shows a block diagram showing the configuration of a content delivery system 100. The content delivery system 100 includes a delivery server 101 and a delivery client 102. A delivery server 101 includes a controller 1011, a low-speed communication unit 1012, a high-speed communication unit 1013, a storage unit 1014, a movement detector 1015, a user interface (UI) 1016, and an external interface 1017. The delivery client 102 includes a controller 1021, a low-speed communication unit 1022, a high-speed communication unit 1023, a storage unit 1024, a movement detector 1025, a user interface 1026, and an external interface 1027.

The delivery server 101 and delivery client 102 have similar configurations. The delivery server delivers content, and the delivery client receives the content. Hereafter, the delivery server may be referred to as a parent device (master device), and the delivery client may be referred to as a child device (slave device). The delivery server is, for example, a kiosk terminal or electronic signage installed in a store, and the delivery client is, for example, a smartphone, a tablet, or a mobile portable terminal of a notebook PC. If the content delivery system 100 is used in a vehicle, the delivery server is, for example, a car navigation system, an in-car entertainment system that plays back music or pictures, or an instrument controller/display, and the delivery client is, for example, a smartphone, a tablet, a notebook PC, a portable display mounted on a seat, or a portable mobile display. In any case, the delivery client 102 is assumed to be a mobile terminal and to be driven by a battery, and the delivery server 101 is assumed to be a fixed terminal and to be driven by a power supply. For this reason, the storage unit 1024 of the delivery client 102 has a smaller capacity than the storage unit 1014 of the delivery server 101.

The low-speed communication units 1012, 1022 wirelessly communicate with each other using a communication system which has a low communication speed but has a wide communication area. Examples of such a communication system include Zigbee, Bluetooth®, DSRC, IEEE 802.11p, IEEE 802.11/b/g/a/n Wi-Fi, 3G, and LTE cellular system. As used herein, the term "low-speed" refers to being a low speed compared to the speed of the high-speed communication unit 1013, 1023 and is on the order of several tens of kbps to several tens of Mbps. As used herein, the term "wide communication area" refers to being wide compared to the communication area of the high-speed communication units 1013, 1023 and is a communication area on the order of several tens of m to several km.

The high-speed communication units 1013, 1023 wirelessly communicate with each other using a communication system which has a high communication speed but has a narrow communication area. Examples of such a communication system include IEEE 802.11ac, which is uses a microwave, and IEEE 802.11ad/WiGig, which uses a millimeter wave. As used herein, the term "high-speed" refers to being a high speed compared to the speed of the low-speed communication units 1012, 1022 and is on the order of a several hundred Mbps to several Gbps. As used herein, the term "narrow communication area" refers to being narrow compared to the communication area of the low-speed communication units 1012, 1022 and is a communication area on the order of several m. The high-speed communication units 1013, 1023 each include multiple antennas and performs directivity control using beamforming or MIMO.

The storage units 1014, 1024 are storage means that store content and are, for example, volatile memories, non-volatile memories, solid-state drives (SSDs), or hard disk drives (HDDs). The capacity of the storage unit 1014 of the delivery server is, for example, several hundred GB to several TB, and the capacity of the storage unit 1024 of the delivery client is for example, several GB to several tens of GB. Accordingly, the storage unit of the delivery server has a larger capacity.

The movement detectors 1015, 1025 detect whether the delivery client (child device) 102 has moved between communication areas (has moved out of the high-communication area or into the high-speed communication area). The movement detector 1025 of the delivery client (child device) 102 detects whether the delivery client (child device) 102 has moved out of the high-speed communication area of the high-speed communication unit 1013 of the delivery server (parent device) 101 or into the high-speed communication area. For example, the movement detector 1025 may detect that the delivery client (child device) 102 has moved between communication areas, on the basis of the result of beamforming training on a radio wave from the delivery server (parent device) 101 or the degradation of the reception quality (e.g., radio-wave reception intensity, RSSI, SNR, SINR, or packet error rate) during high-speed communication.

The delivery client (child device) 102 may include means that is able to detect the movement of the delivery client using, for example, an acceleration sensor, gyro sensor, magnetic field sensor, or GPS and may detect whether the delivery client has moved between communication areas, using the output of such means.

The movement detector 1015 of the delivery server (parent device) 101 determines whether the delivery client (child device) 102 has moved out of the communication area of the high-speed communication unit 1013 or into the communication area of the high-speed communication unit 1013. For example, the movement detector 1015 may detect that the delivery client 102 has moved out of the high-speed communication area or into the high-speed communication area, on the basis of the result of beamforming training on a radio wave from the delivery client (child device) 102 or the degradation of the reception quality (e.g., radio-wave reception intensity, RSSI, SNR, SINR, or packet error rate) during high-speed communication.

The delivery server (parent device) 101 may make determination upon receipt of a report of a movement result detected by the delivery client (child device) 102.

The user interfaces (UI) 1016, 1026 show information to the user or are operated by the user and are, for example, display panels, LEDs, touchscreens, keypads, keyboards, switches, or voice input/output devices. In the case of content delivery, the user interfaces (UI) 1016, 1026 are used, for example, to select or cancel content, to make settings about delivery, or to work on or view/listen to delivered content. When delivering content such as picture data or music data, a display or speaker for viewing or listening to such content is used; when delivering control data or content for updating a program, such a display is not used. The delivery server 101 and delivery client 102 may share the user interfaces. For example, the user interface of the delivery server (parent device) 101 may be operated by performing a remote display operation using the user interface of the delivery client (child device) 102 with low-speed communication. Conversely, the user interface of the delivery client (child device) 102 may be operated using the user interface of the delivery server (parent device) 101.

The external interfaces 1017, 1027 are interfaces that are connected to external devices. Examples of the external interfaces 1017, 1027 include network interfaces of Ethernet, PLC, and in-car CAN and peripheral device interfaces of RS232C, USB, HDMI®, and DisplayPort. The external interfaces 1017, 1027 need not be wire-connected interfaces and may be wirelessly connected interfaces.

The controllers 1011, 1012 control the elements of the delivery server (parent device) 101 and delivery client (child device) 102 and provide content delivery services. While the controllers 1011, 1012 typically each consist of a CPU and a software program, they may each consist of, for example, hardware such as dedicated LSI or FPGA.

Figure 2:
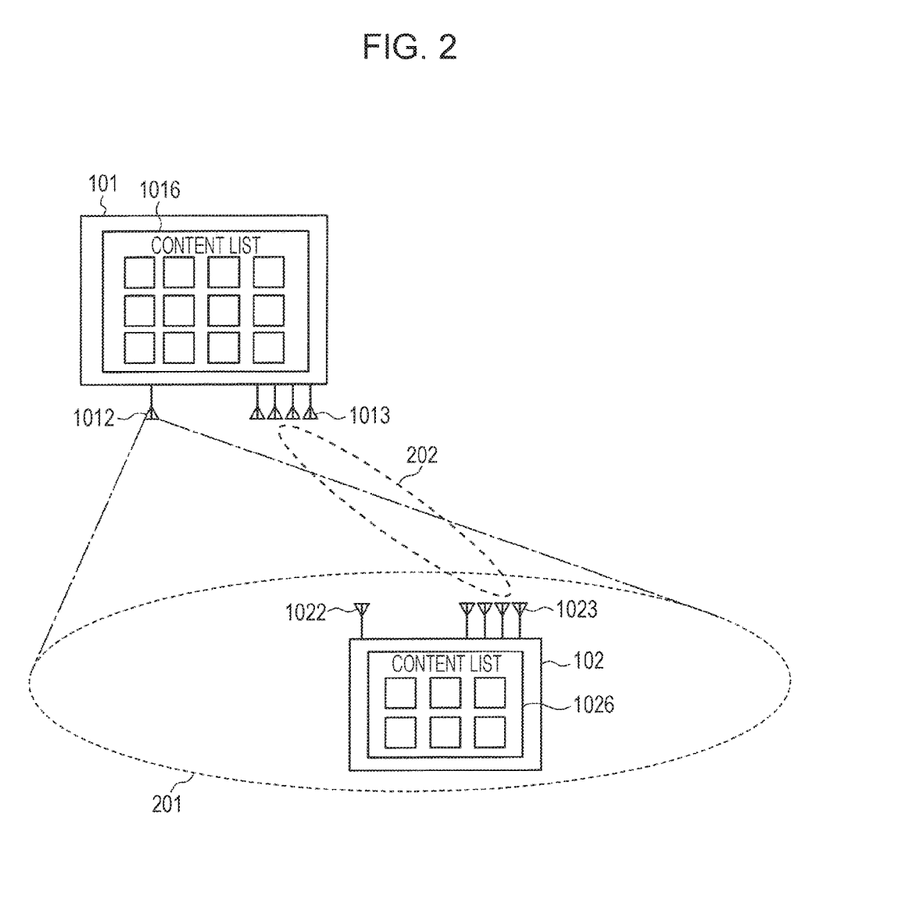
FIG. 2 is a system diagram showing an example of the configuration of the content delivery system.

FIG. 2 shows an example of the configuration of the content delivery system. In FIG. 2, the delivery server (parent device) 101 and delivery client (child device) 102 wirelessly communicate with each other through the low-speed communication units 1012, 1022 and high-speed communication units 1013, 1023. FIG. 2 shows the communication area 201 of the low-speed communication units and the communication area 202 of the high-speed communication units. The low-speed communication units 1012, 1022 cover the wide communication area 201 using approximately non-directional antennas. The high-speed communication units 1013, 1023 covers the narrow communication area 202 using directional antennas.

The delivery server (parent device) 101 displays, on the user interface 1016, a list of pieces of content deliverable to the delivery client (child device) 102. Thus, the user can select content and make a setting for delivery by operating the user interface 1016. On the other hand, the delivery client (child device) 102 displays, on the user interface 1026, a list of pieces of content receivable from the delivery server (parent device) 101. Thus, the user can select desired content and make a setting for reception by operating the user interface 1026. For example, a list of pieces of content or control information about the delivery settings is transmitted by the low-speed communication units 1012, 1022, and content itself is transmitted by the high-speed communication units 1013, 1023.

Figure 3:
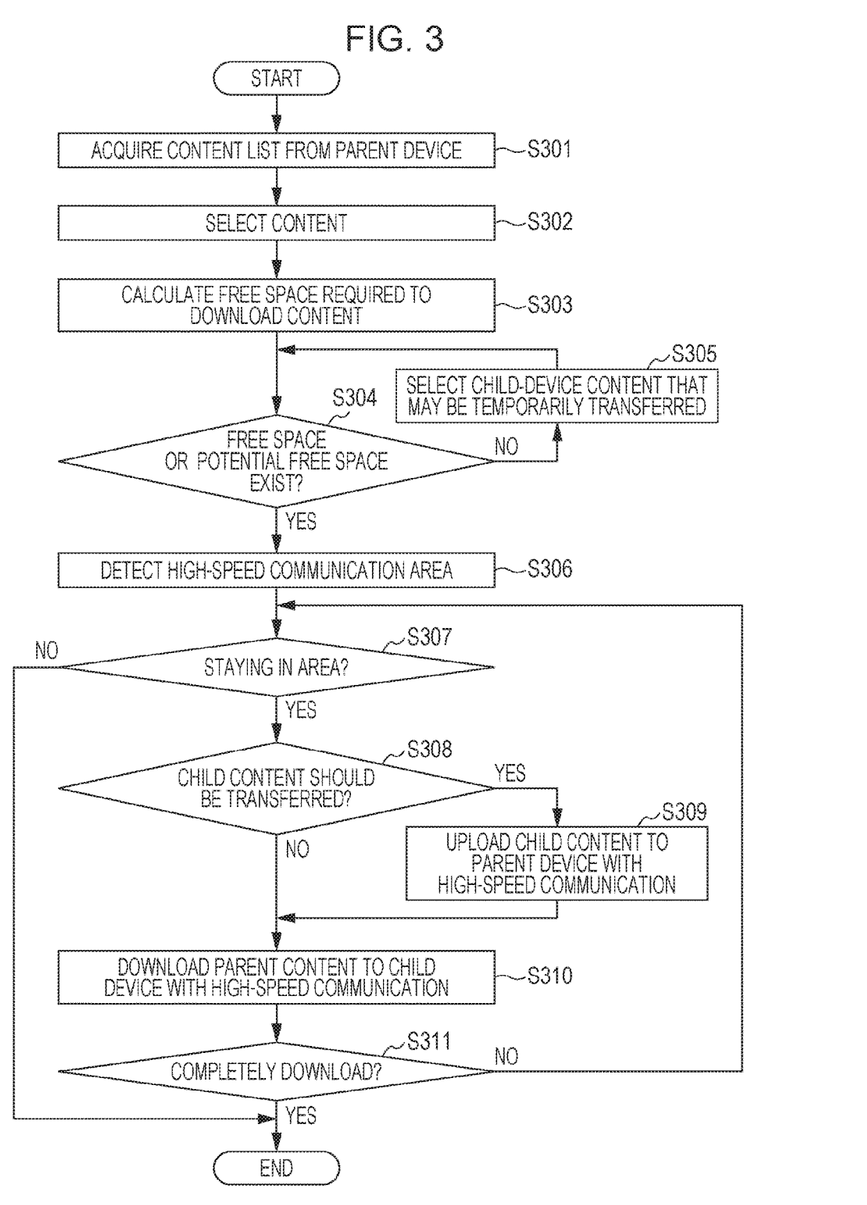
FIG. 3 is a flowchart showing the flow of content delivery.

FIG. 3 shows an example of a flowchart of content delivery performed by the content delivery system. When the delivery server (parent device) 101 and delivery client (child device) 102 establish a low-speed communication link, a content delivery flow starts.

In step S301, the delivery client (child device) 102 acquires a list of pieces of content from the delivery server (parent device) 101. At this time, the delivery server (parent device) 101 selects a list of pieces of deliverable content associated with the identification (ID) of the delivery client (child device) 102 and then reports the list of pieces of content to the delivery client (child device) 102.

Figure 5A:
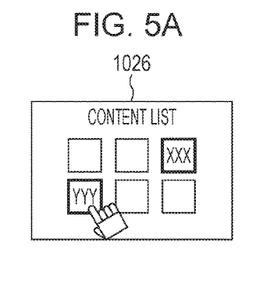
FIG. 5A is a diagram showing an example of user interface.

In step S302, the user selects desired content from the reported list of pieces of content on the user interface 1026 of the delivery client (child device) 102. For example, the user selects desired content by clicking, touching, or tapping one of thumbnails or icons displayed on the user interface 1026 and indicating the pieces of content (see FIG. 5A). While the selected content is surrounded by a thick frame on the user interface 1026 in FIG. 5A, the selected content may be displayed in any manner as long as the content is recognized to be selected. For example, the selected content may be displayed so as to be enlarged and be in front of the other content, or may be displayed so as to be shrunk and be behind the other content.

Figure 5B:
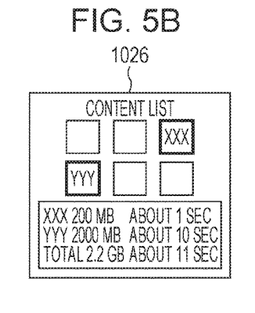
FIG. 5B is a diagram showing an example of user interface.

In step S303, after the user selects content, the delivery client (child device) 102 calculates free space required to download the content. The delivery client 102 also calculates the total volume of the selected content and shows the total volume to the user on the user interface 1026 (see FIG. 5B). At this time, the delivery client (child device) 102 shows at least one of the volume of the content and the estimated download time.

In step S304, the delivery client (child device) 102 determines whether the free space calculated in step S303 already exists in the storage unit 1024 thereof or whether content that may be temporarily transferred has already been selected. If free space or potential free space exists (YES in step S304), the delivery client 102 reserves the delivery of the content and proceeds to step S306. If free space or potential free space does not exist (NO in step S304), the delivery client 102 proceeds to step S305.

Figure 5C:
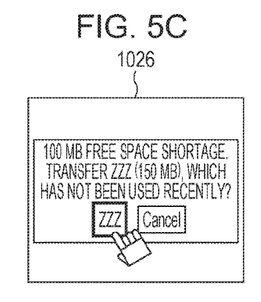
FIG. 5C is a diagram showing an example of user interface.

In step S305, to make free space required to download the content, the delivery client (child device) 102 shows, to the user, content that may be temporarily transferred from the storage unit 1024 thereof so that the user can select it (see FIG. 5C).

As used herein, the term "content that may be temporarily transferred" refers to, for example, content having a volume corresponding to the free space shortage, of the pieces of content that have been accessed on the earliest date and time. Such content may be selected as follows: the volumes of multiple pieces of content are summed up in the descending order of the earliness of the access date and time; and when the total volume of pieces of content reaches the free space, the pieces of content are selected.

Or, content least related to the content desired to download, for example, moving images of a different genre may be selected. Or, content most related to the content desired to download, for example, moving images preceding moving images desired to download, of a series of moving images may be selected.

Or, content of the lowest interest may be selected from the content selection or viewing/listening histories of the user.

Or, if the free space falls below a predetermined value (e.g., 10% of the whole capacity), content may be automatically selected in accordance with one of the above methods. Or, content that may be temporarily transferred may be previously selected by the user. In this case, the presentation of such content to the user may be omitted, or a message stating that "the previously selected content will be temporarily transferred" may be displayed on the user interface 1026 so that the user can confirm the selection of such content.

As seen above, the controller 1021 selects content that may be temporarily transferred and shows it to the user. Thus, free space can be obtained in a short time, and user convenience is improved. After the user selects the content that may be temporarily transferred, the delivery client (child device) 102 returns to step S304 to again calculate free space. Note that if there is no content that may be temporarily transferred, the process may return to step S302 so that the user again selects content to be downloaded (not shown).

Figure 5D:
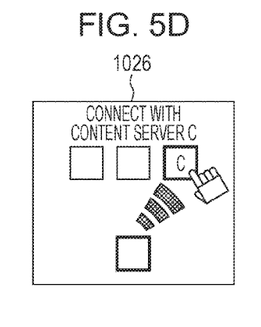
FIG. 5D is a diagram showing an example of user interface.

In step S306, the delivery client (child device) 102 detects the high-speed communication area 202. Specifically, the delivery client (child device) 102 starts the high-speed communication unit 1023, detects the high-speed communication area 202 formed by the high-speed communication unit 1013 of the delivery server (parent device) 101, and establishes a communication link. For example, the delivery client (child device) 102 may detect the high-speed communication area 202 by receiving a beacon transmitted by the high-speed communication unit 1013 of the delivery server (parent device) 101. Or, the delivery client (child device) 102 may detect the high-speed communication area 202 by transmitting a beacon or connection request signal from the high-speed communication unit 1023 and receiving a response from the delivery server (parent device) 101. Or, the delivery client (child device) 102 may detect the high-speed communication area 202 by reporting the ID thereof and a high-speed communication request to the delivery server (parent device) 101 with low-speed communication and receiving position information or a communication area ID from the delivery server (parent device) 101. At this time, the direction in which the delivery server (parent device) 101 is present may be displayed, as shown in FIG. 5D. Since the high-speed communication unit 1023 uses a directional antenna, for example, the delivery client (child device) 102 may report the set point of the beam direction together and display it on the user interface 1026. After the high-speed communication unit 1013 of the delivery server (parent device) 101 and the high-speed communication unit 1023 of the delivery client (child device) 102 establish a communication link, the transmission/reception of the content data is performed.

In step S307, it is determined whether the delivery client (child device) 102 is staying in the high-speed communication area 202, on the basis of the detection results of the movement detectors 1015, 1025. If the delivery client (child device) 102 is present outside the high-speed communication area, the subsequent transmission/reception of the content data is cancelled, and the process ends. If the delivery client (child device) 102 is staying in the high-speed communication area, the process proceeds to step S308.

In step S308, the delivery client (child device) 102 determines whether content should be temporarily transferred from the storage unit 1024 thereof. If the content that has been selected in step S305 and that may be temporarily transferred exists in the storage unit 1024 (YES in step S308), the process proceeds to step S309. If content that may be temporarily transferred does not exist in the storage unit 1024, for example, if sufficient free space is present even if any content is not temporarily transferred (NO in step S308), the process proceeds to step S310.

In step S309, the delivery client (child device) 102 temporarily transfers the content from the storage unit 1024 thereof to the storage unit 1014 of the delivery server (parent device) 101. The content is uploaded through an uplink from the high-speed communication unit 1023 to the high-speed communication unit 1013.

Figure 5E:
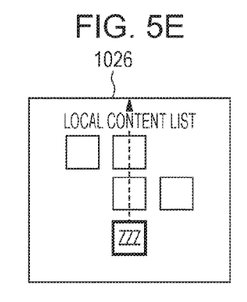
FIG. 5E is a diagram showing an example of user interface.
Figure 5F:
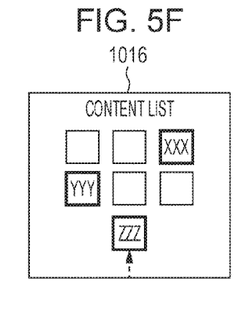
FIG. 5F is a diagram showing an example of user interface.

At this time, in order to intuitively show, to the user, a message that the content is being uploaded, a thumbnail of the content to be uploaded is shown on the UI 1026 of the delivery client (child device) 102 so as to move upward in the screen, as shown in FIG. 5E. The thumbnail may also be shown on the UI 1016 of the delivery server (parent device) 101 so as to move from a lower portion of the screen to the center, as shown in FIG. 5F.

To prevent the display of other thumbnails from being obstructed, this thumbnail may be shrunk (e.g., 80%) and then displayed so as to be behind the other thumbnails. A progress bar indicating the progress, the transfer time, or the transfer speed may be displayed together.

After uploading the content, the delivery client (child device) 102 deletes the content from the storage unit 1024, and the delivery server (parent device) 101 stores the content in the storage unit 1014. Thus, free space is made in the storage unit 1024 of the delivery client (child device) 102.

Figure 5G:
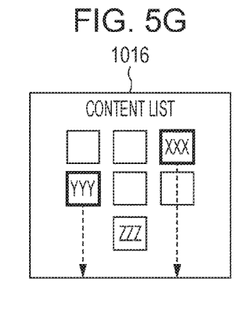
FIG. 5G is a diagram showing an example of user interface.
Figure 5H:
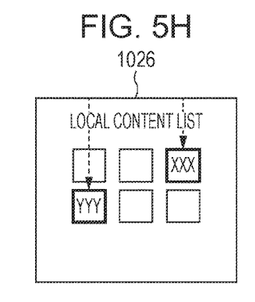
FIG. 5H is a diagram showing an example of user interface.

In step S310, the delivery server (parent device) 101 delivers the content in the storage unit 1014 thereof to the storage unit 1024 of the delivery client (child device) 102. The content is downloaded via a downlink from the high-speed communication unit 1013 of the delivery server (parent device) 101 to the high-speed communication unit 1023 of the delivery client (child device) 102. At this time, in order to intuitively show, to the user, a message that the content is being downloaded, thumbnails of the pieces of content to be downloaded are shown on the UI 1016 of the delivery server (parent device) 101 so as to move downward in the screen, as shown in FIG. 5G. The thumbnails may also be shown on the UI 1026 of the delivery client (child device) 102 so as to move from upper portions of the screen to the center, as shown in FIG. 5H. A progress bar indicating the progress, the transfer time, or the transfer speed may be displayed together. After downloading the content, the delivery client (child device) 102 stores the content in the storage unit 1024.

In step S311, it is determined whether the content selected in step S302 has been completely downloaded. If the content has not been completely downloaded, the process returns to step S307 (NO in step S311); if the content has been completely downloaded, the process ends (YES in step S311). While step S301 of FIG. 3 has been described assuming that the delivery client (child device) 102 is present outside the high-speed communication area 202, step S306 may be skipped if it is staying within the high-speed communication area 202.

Figure 4:
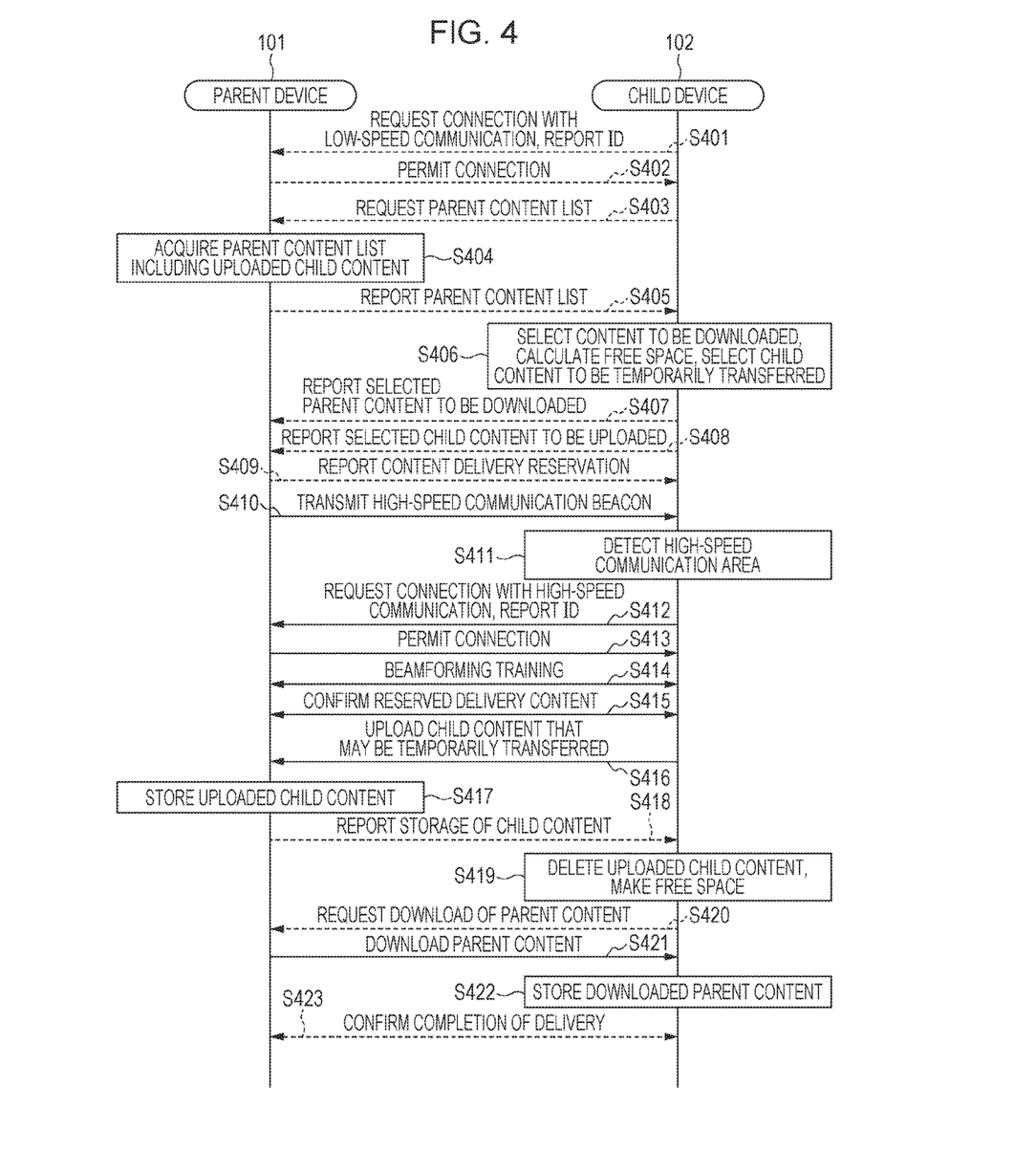
FIG. 4 is a sequence diagram showing an example of the exchange of information between devices.

FIG. 4 shows an example of sequences between the delivery server (parent device) 101 and delivery client (child device) 102. In FIG. 4, dotted arrows show the communication between the low-speed communication unit 1012 of the delivery server (parent device) 101 and the low-speed communication unit 1022 of the delivery client (child device) 102. Solid arrows show the communication between the high-speed communication unit 1013 of the delivery server (parent device) 101 and the high-speed communication unit 1023 of the delivery client (child device) 102.

In step S401, the delivery client (child device) 102 reports the ID thereof to the delivery server (parent device) 101 and makes a connection request, Examples of the ID include the MAC address or IP address of the low-speed communication unit 1022 or a user ID used to authenticate the user.

In step S402, the delivery server (parent device) 101 determines whether the connection can be made, on the basis of the ID of the delivery client (child device) 102 and reports the permission of the connection. Thus, a low-speed communication link is established.

In step S403, the delivery client (child device) 102 requests the delivery server (parent device) 101 to report a list of pieces of deliverable content held by the delivery server 101.

In step S404, the delivery server (parent device) 101 acquires a list of pieces of content, including pieces of content deliverable to the delivery client (child device) 102 and pieces of content previously uploaded by the delivery client (child device) 102 (pieces of child content).

In step S405, the delivery server (parent device) 101 reports the list of pieces of parent content to the delivery client (child device) 102.

In step S406, the user selects content to be downloaded from the list of pieces of parent content. The delivery client (child device) 102 calculates free space required to download the content. If sufficient free space does not exist, the delivery client (child device) 102 shows, to the user, content (child content) that may be temporarily transferred so that the user can select it. The delivery client (child device) 102 reports the selected parent content to be downloaded and the selected child content to be uploaded to the delivery server (parent device) 101 in step S407 and step S408, respectively.

In step S409, the delivery server (parent device) 101 confirms the parent content to be downloaded when the delivery client (child device) 102 enters the high-speed communication area 202 next time and the child content to be uploaded at the same timing and reports a content delivery reservation to the delivery client (child device) 102.

In step S410, the delivery server (parent device) 101 periodically transmits a beacon signal for connecting the delivery client (child device) 102 to the high-speed communication area 202.

In step S411, the delivery client (child device) 102 detects the high-speed communication area 202 on the basis of the content delivery reservation reported in step S409.

In step S412, the delivery client (child device) 102, which has received the beacon signal from the delivery server (parent device) 101 and detected the high-speed communication area 202, reports the ID thereof to the delivery server (parent device) 101 to make a connection request. Examples of the ID include the MAC address or IP address of the high-speed communication unit 1023 and a user ID used to authenticate the user.

In step S413, the delivery server (parent device) 101 determines whether the connection can be made, on the basis of the ID of the delivery client (child device) 102 and reports the permission of the connection. Thus, a high-speed communication link is established.

In step S414, beamforming training for matching the antenna directivities is performed between the high-speed communication unit 1013 of the delivery server (parent device) 101 and the high-speed communication unit 1023 of the delivery client (child device) 102. For example, in millimeter-wave communication, training for matching both directivities is performed in accordance with the IEEE 802.11ad sector level sweep (SLS) protocol or beam refinement protocol (BRP). In microwave communication, for example, propagation path training for MIMO transmission is performed in accordance with the IEEE 802.11ac protocol. Thus, the communication area is narrowed; however, the SNR is improved, and higher-speed larger-volume communication is performed.

In step S415, the reserved delivery content reported with the low-speed communication in step S409 is confirmed. In step S416, the child content that may be temporarily transferred is uploaded to the parent device with high-speed communication.

In step S417, the delivery server (parent device) 101 stores the uploaded child content in the storage unit 1014.

In step S418, the delivery server (parent device) 101 reports the completion of the storage of the child content with low-speed communication.

In step S419, the delivery client (child device) 102 deletes the uploaded child content on the basis of the report received in step S418 to make free space in the storage unit 1024.

In step S420, the delivery client (child device) 102, which has made the free space, requests the delivery server (parent device) 101 to download the parent content.

In step S421, the delivery server (parent device) 101 downloads the requested parent content to the delivery client (child device) 102 at high speed.

In step S422, the delivery client (child device) 102 stores the downloaded parent content in the storage unit 1024.

In step S423, the delivery server (parent device) 101 and delivery client (child device) 102 confirm the completion of the delivery.

Second Embodiment

Figure 6:
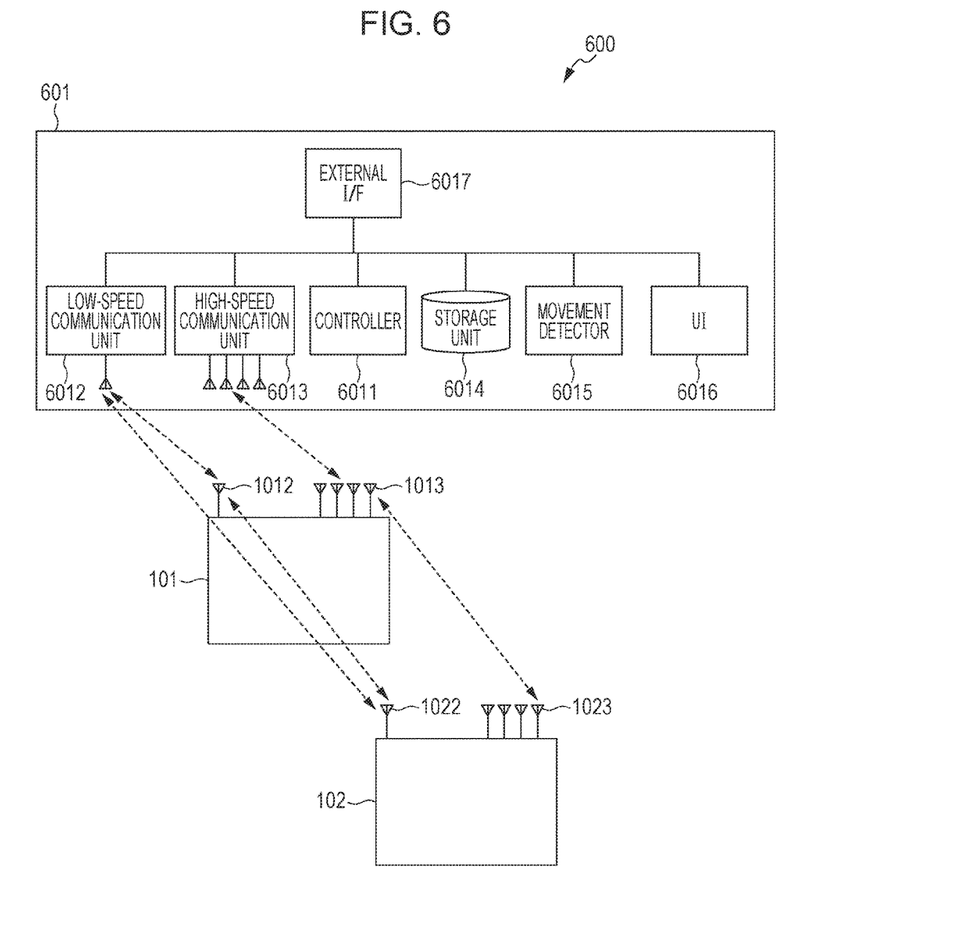
FIG. 6 is a block diagram showing a second embodiment.

FIG. 6 shows a content delivery system 600 of a second embodiment. In FIG. 6, an edge server (host server) 601, a delivery server 101, and a delivery client 102 are connected to one another through low-speed communication units 6012, 1012, 1022 and high-speed communication units 6013, 1013, 1023. The delivery server 101 is connected to the delivery client 102 through the low-speed communication units 1012, 1022 and the high-speed communication units 1013, 1023.

The edge server 601 includes a controller 6011, the low-speed communication unit 6012, the high-speed communication unit 6013, a storage unit 6014, a movement detector 6015, a user interface 6016, and an external interface 6017.

The edge server 601 has a configuration similar to that of the delivery server 101. The internal blocks 6011 to 6017 of the edge server 601 have functions similar to those of the internal blocks 1011 to 1017 of the delivery server 101. The capacity of the storage unit 6014 of the edge server 601 is larger than that of a storage unit 1014 of the delivery server 101 and is, for example, on the order of several TB to several hundred TB.

As in the first embodiment, the delivery server 101 and delivery client 102 are connected to each other with a parent-child relationship. Further, in the second embodiment, the edge server 601 and delivery server 101 are connected to each other with a parent-child (master-slave) relationship. For example, the delivery server 101 acts as a parent device with respect to the delivery client 102 and acts as a child content with respect to the edge server 601. Such hierarchy may be constructed with any number of levels.

When the delivery server 101 attempts to store content temporarily transferred from the delivery client 102 in the storage unit 1014, the storage unit 1014 may lack free space. In this case, the delivery server 101 as a child device of the edge server 601 may temporarily transfer the content of the delivery client 102 to the edge server 601 in order to make free space in the storage unit 1014. Note that content temporarily transferred from the delivery client 102 selected in step S305 (FIG. 3) performed by the delivery server 101 may be preferentially selected as content temporarily transferred to the edge server 601.

Figure 7:
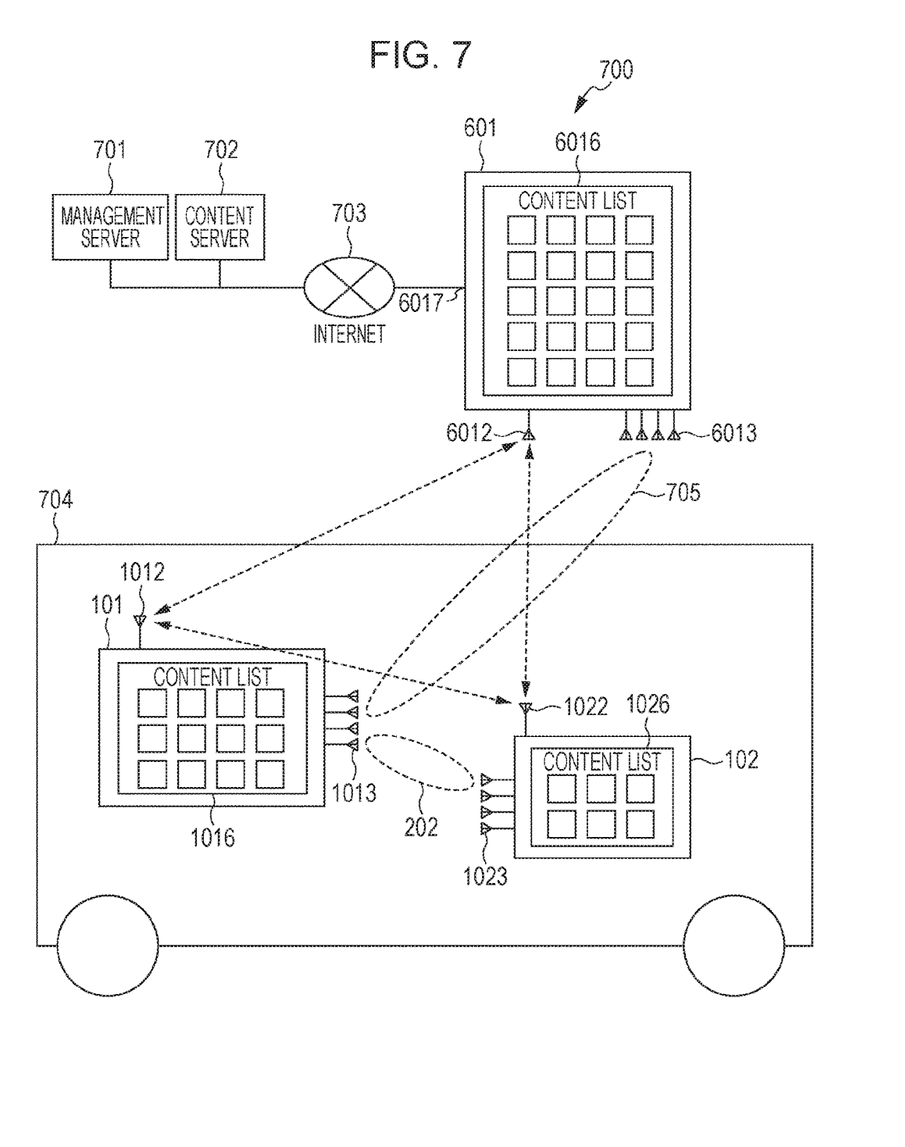
FIG. 7 is a system diagram showing the second embodiment.

FIG. 7 shows an example of the configuration of a content distribution system 700 of the second embodiment. In FIG. 7, the content delivery system 700 includes a management server 701, a content server 702, an Internet 703, a vehicle 704, and the high-speed communication area 705 of an edge server 601. The vehicle 704 includes a delivery server 101 and a delivery client 102.

The delivery client 102 is, for example, a tablet terminal brought into the vehicle 704 and operated by the user. The delivery server 101 is, for example, an in-car entertainment system or car navigation system installed on the dashboard of the vehicle 704. The edge server 601 is installed outside the vehicle 704, for example, at a store, parking lot, or intersection.

The management server 701 manages, for example, content information, user information, user authentication, and the content billing content delivery system 700. The content server 702 stores all pieces of information content to be delivered and is connected to multiple edge servers 601 through the Internet 703. For example, the content server 702 is connected to the external interface 6017 of the edge server 601 via Ethernet and Internet 703. The content server 702 may include multiple distributed storage devices. Also, content-specific multiple management servers 701 may be provided.

The high-speed communication unit 6013 of the edge server 601 has directivity and a narrow communication area. For this reason, edge servers 601 are installed at various places such as stores, parking lots, and intersections in a distributed manner. The edge server 601 need not store all pieces of content stored in the content server 702 and, for example, may store content by downloading or uploading content to be used from or to the content server 702 in accordance with the installation place, target user, or time zone.

The low-speed communication unit 6012 of the edge server 601 has a wide communication area and therefore communicates with the delivery server 101 and delivery client 102. On the other hand, the high-speed communication unit 6013 of the edge server 601 have directivity and a narrow communication area and therefore is not always able to directly communicate with the delivery server 101 or delivery client 102. In this case, multihop communication may be used in such a manner that the edge server 601 communicates with the delivery server 101 at high speed and the delivery client 102 communicates with the delivery server 101 at high speed. Or multihop communication may be used in such a manner that the edge server 601 communicates with the delivery client 102 at high speed and the delivery server 101 communicates with the delivery client 102 at high speed.

As in the first embodiment, the edge server 601 and delivery server 101 are connected to each other with a parent-child relationship. Similarly, the delivery server 101 and delivery client 102 are connected to each other with a parent-child relationship. For example, the edge server 601, delivery server 101, and delivery client 102 are connected to one another with a parent-child-grandchild relationship.

The user operates the delivery client (tablet) 102 to log into the content delivery system 700. Or, the user may operate the UI 1016 of the delivery server 101 to log into the content delivery system 700. Or, the user may operate the UI 6016 of the edge server 601 to log into the content delivery system 700. At this time, the delivery client 102 establishes communication links with the delivery server 101 and edge server 601 through the low-speed communication unit 1022 and transmits a user ID to make an authentication request to the management server 701.

When the management server 701 authenticates the user, the delivery client 102 is allowed to access content stored in the delivery server 101 and edge server 601 and associated with the user ID. For example, a content list request or delivery reservation request is transmitted from the delivery client 102 to the delivery server 101, from the delivery server 101 to the edge server 601, and from the edge server 601 to the content server 702 in this order at low speed or through the external interfaces in accordance with the sequences shown in FIGS. 3 and 4 and then a process for using content is performed.

The edge server 601 and delivery server 101, which have established the high-speed communication link, upload content that may be temporarily transferred or download delivery content as necessary. Similarly, the delivery server 101 and delivery client 102, which have established the high-speed communication link, upload content that may be temporarily transferred or download delivery content as necessary.

Application Example

The first and second embodiments can be applied to application examples as described below. An edge server 601, an in-car entertainment management device serving as a delivery server 101, and a tablet serving as a delivery client 102 act differently in the parent-child relationships thereof, as seen when the edge server (parent device) 601 and in-car entertainment management device (child device) act with respect to each other and when the car entertainment management device (parent device) and tablet (child device) act with respect to each other.

Example of Use as In-Car Entertainment

The in-car entertainment management device (the delivery server 101 as a child device) automatically checks the capacity of the in-car storage (storage unit 1024). If the free space is less than a threshold (e.g., 10%), the in-car entertainment management device uploads content that may be temporarily transferred, to the edge server (parent device) 601 using a communication system whose communication situation is better, of LTE/Wi-Fi (low-speed communication units 6012, 1012) and WiGig (high-speed communication units 6013, 1013) when started next time.

If the vehicle 704 having the in-car entertainment management device (the delivery server 101 as a child device) mounted thereon is a private vehicle, the user selects parent content according to his or her preference and downloads it from the edge server 601; if the vehicle 704 is public transportation (e.g., a train, bus, taxi), the user selects parent content according to the service time and downloads it from the edge server 601.

If the user's tablet (the delivery client 102 as a child device) detects a WiGig (high-speed communication) beacon signal equal to or higher than a predetermined threshold (e.g., −68 dBm) from the in-car entertainment management device (the delivery server 101 as a parent device), it automatically checks the capacity of the storage (storage unit 1024) thereof and reports the capacity to the in-car entertainment management device (the delivery server 101 as a parent device).

By installing the tablet (the delivery client 102 as a child device) on a cradle built in the headrest of a seat in the vehicle 704, the tablet (the delivery client 102 as a child device) and the in-car entertainment management device (the delivery server 101 as a parent device) start WiGig (the high-speed communication units 1013, 1023) and establish a connection.

Multiple tablets (delivery clients 102 as child devices) in the vehicle 704 and the single in-car entertainment management device (the delivery server 101 as a parent device) are connected to one another with low-speed communication and high-speed communication and share content. Thus, child content uploaded to the in-car entertainment management device by a first tablet can be downloaded as parent content from the in-car entertainment management device by a second tablet.

When the in-car entertainment management device (the delivery server 101 as a child device) detects that the ignition of the vehicle 704 has been turned off, it checks pieces of content in the storage unit 1024 and deletes pieces of content that have yet to be billed or authenticated, of pieces of content downloaded from the edge server (parent device) 601 and required to be billed and authenticated for viewing/listening or use.

The in-car entertainment management device (the delivery server 101 as a child device) stores pieces of content which have been billed and authenticated or pieces of content which need not be billed or authenticated, in the storage unit 1024. Or, when the movement detector 1025 detects that the delivery client 102 has moved out of the high-speed communication area 705, the in-car entertainment management device (the delivery server 101 as a child device) may delete pieces of content that have yet to be billed or authenticated.

If the in-car entertainment management device (the delivery server 101 as a parent device) determines that the user will get off the vehicle 704 and take the tablet (the delivery client 102 as a child device) out of the vehicle 704, it may delete the parent content downloaded to the tablet (the delivery client 102 as a child device) and again download the child content temporarily transferred to the in-car entertainment management device.

For example, the in-car entertainment management device may detect that the user will take the tablet (the delivery client 102 as a child device) out of the vehicle 704 at the following timings: when it detects that the ignition of the vehicle 704 has been turned off; when it detects that a door of the vehicle 704 has opened; in the case of a bus, when it detects a predetermined time (e.g., 10 sec) before the time at which the bus is scheduled to arrive at a bus stop at which the user will get off; in the case of a taxi, when it detects that the user is paying a passenger fare; and in the case of a train, when it detects a predetermined time (e.g., 10 sec) before the time at which the train is scheduled to arrive at a station at which the user will get off.

When the in-car entertainment management device (the delivery server 101 as a child device) detects that the ignition of the vehicle 704 has been turned off, it may check the free space of the storage unit 1024. If the free space is less than a predetermined threshold (e.g., 10%), it may make a delivery reservation for temporarily transferring child content to the edge server (parent device) 601 when the ignition is turned on next time.

Example of Use at Car Dealer

A shop of a car dealer is set as the destination of a car navigation system (delivery server 101) and then information about a vehicle 704 is previously transmitted to a server (edge server 601) installed in the shop serving as the destination through LTE communication (low-speed communication unit 1012). The server downloads data content used to update the engine control unit (ECU) or electronic control unit (ECU) of the vehicle 704 from the server (content server 702) of an automobile manufacturer and the latest map information content from the server (content server 702) of a map maker and stores the downloaded content in the storage unit 6014.

No matter whether the user is registered in the content delivery system 700 of the dealer, for example, the user can download an advertisement or sale information from the dealer to the delivery server 101 or delivery client 102 and use it.

If the user is registered in the content delivery system 700 of the dealer, for example, the user can download information indicating that a simple oil exchange service is available to the delivery server 101 or delivery client 102 and use it.

Also, if the user is registered in the content delivery system 700 of the dealer, for example, the user can download information indicating that a high new car purchase discount service is available to the delivery server 101 or delivery client 102 in accordance with the frequency with which the user has come to the dealer and used the content delivery system and can use it.

The radio-wave intensity and direction of WiGig communication (high-speed communication unit 6013) from the server (edge server 601) of the dealer may be detected. Also, an icon may be displayed on an instrument, the car navigation system (delivery server 101), or the UI 1026 of the user tablet (delivery client 102), and the connection of the high-speed communication unit 1023 may be started, for example, by clicking, touching, or tapping the icon.

A guide path for automatically moving and parking the vehicle 704 may be shown to the user on an instrument mounted on the vehicle 704 or the UI 1016 of the car navigation system (delivery server 101) on the basis of the detected radio-wave intensity and direction of the WiGig communication (high-speed communication unit 6013).

If the WiGig communication is established during parking, the transition of ECU or content to the update mode, a reduction in the vehicle security level, and the ignition on of the vehicle 704 are continued. Update start/stop buttons may be displayed on the UIs 1016, 1026 of the tablet so that the user can start an update operation after paying an update fee.

To make free space for update in the storage of the in-car server (delivery server 101), data that may be temporarily transferred is uploaded from the in-car server (delivery server 101) to the edge server 601.

Temporarily stored data (map information or vehicle information) in the server of the dealer is downloaded to the storage unit 1014 of the vehicle 704 parked in a parking lot of the dealer with WiGig communication and temporarily stored.

After confirming that the shift position is parking, the in-car ECU and the map data of the car navigation system are updated using the temporarily stored data in the storage unit 1014 of the vehicle 704. After the update, the temporarily stored data is deleted, and the data temporarily uploaded to the edge server 601 is downloaded again.

The update state may be reported to the user by displaying the countdown of the remaining update time calculated from the volume of update data and the communication speed on the UI 1026 of the tablet (delivery client 102) taken out of the vehicle 704 and connected with the delivery server 101 in the vehicle 704 using one of WiGig, Wi-Fi, and LTE.

The server (edge server 601) of the dealer checks an update state signal from the tablet (delivery client 102) and then determines whether the free space in the tablet (delivery client 102) is equal to or greater than a predetermined value. If the free space is equal to or greater than the predetermined value, part of the data stored in the tablet (delivery client 102) is temporarily stored in the server (the storage unit 6014 of the edge server 601) of the dealer. After free space is made in the tablet (delivery client 102), a list of a dealer option catalog, coupon information, and temporarily freerented entertainment information (electronic library, movies) stored in the server (edge server 601) of the dealer is displayed on the tablet (delivery client 102), and information selected by the user is downloaded.

If the server (edge server 601) of the dealer and the parking vehicle 704 fail to communicate with each other by WiGig, WiGig communication is performed by hopping the tablet (delivery client 102) taken out of the vehicle 704 or the access point [the edge server 601-1 (not shown)] of an adjacent vehicle 704-1 (not shown).

If the other vehicle 704-1 is in WiGig communication, the delivery server 101 in the vehicle 704 waits with the accessory power supply (ACC) of the vehicle 704 turned on. After receiving an update completion signal from the other vehicle 704-1 or the server (edge server 601) of the dealer, the ignition of the vehicle 704 is turned on and it is confirmed that the shift position is parking. Then, an update process is performed.

If the server (edge server 601) of the dealer has failed to receive a WiGig radio wave from the delivery server 101 of the vehicle 704 for a predetermined time or more, it deletes the temporarily stored data (the data specific to the vehicle 704) therein. For data (map information) that does not depend on the vehicle 704, the server (edge server 601) of the dealer determines whether such data should be deleted or stored, on the basis of the free space therein.

When WiGig communication is established again, the server (edge server 601) of the dealer confirms that the shift position is parking and resumes the update process without deleting the storage data temporarily stored in the vehicle 704.

While the embodiments have been described with reference to the drawings, the present disclosure is not limited thereto, as a matter of course. It is apparent that those skilled in the art can conceive of various changes or modifications thereto without departing from the scope set forth in the claims. Of course, such changes or modifications are construed to fall within the technical scope of the present disclosure. Further, any elements of the embodiments may be combined without departing from the spirit and scope of the present disclosure.

Various aspects of the embodiments of the present disclosure include the following:

A content delivery system of a first aspect of the present disclosure is a content delivery system including a content delivery server and a content delivery client. The content delivery client includes a first wireless communication circuitry that performs first wireless communication, a second wireless communication circuitry that performs second wireless communication, and a first storage. The content delivery server includes a third wireless communication circuitry that performs the first wireless communication, a fourth wireless communication circuitry that performs the second wireless communication, and a second storage having a larger capacity than a capacity of the first storage. The content delivery client transmits control information about download of first content to the content delivery server through the first wireless communication circuitry. The content delivery client detects an area of the second wireless communication using the second wireless communication circuitry. If free space of the first storage is smaller than a volume of the first content, the content delivery client uploads second content stored in the first storage to the content delivery server through the second wireless communication circuitry and then downloads the first content. The content delivery server receives the control information about the download of the first content from the content delivery client through the third wireless communication circuitry. The content delivery server detects the area of the second wireless communication using the fourth wireless communication circuitry. When the second content is uploaded from the content delivery client, the content delivery server temporarily stores the second content in the second storage and then downloads the first content to the content delivery client through the fourth wireless communication circuitry.

According to a content delivery system of a second aspect of the present disclosure, in the content delivery system of the first aspect, a speed of the first wireless communication is lower than a speed of the second wireless communication.

According to a content delivery system of a third aspect of the present disclosure, in the content delivery system of the first aspect, the first wireless communication is microwave communication.

According to a content delivery system of a fourth aspect of the present disclosure, in the content delivery system of the first aspect, the second wireless communication is millimeter-wave communication.

A content delivery method of a fifth aspect of the present disclosure is a content delivery method performed by a content delivery server and a content delivery client. The method includes transmitting, by the content delivery client, control information about download of first content to the content delivery server using first wireless communication, detecting, by the content delivery client, an area of second wireless communication, if free space of a first storage of the content delivery client is smaller than a volume of the first content, uploading, by the content delivery client, second content stored in the first storage to the content delivery server using the second wireless communication, when the second content is uploaded from the content delivery client, temporarily storing, by the content delivery server, the second content in a second storage of the content delivery server and then downloading the first content to the content delivery client using the second wireless communication, and downloading, by the content delivery client, the first content using the second wireless communication.

According to a content delivery method of a sixth aspect of the present disclosure, in the content delivery method of the fifth aspect, a speed of the first wireless communication is lower than a speed of the second wireless communication.

According to a content delivery method of a seventh aspect of the present disclosure, in the content delivery method of the fifth aspect, the first wireless communication is microwave communication.

According to a content delivery method of an eighth aspect of the present disclosure, in the content delivery method of the fifth aspect, the first wireless communication is millimeter-wave communication.

A mobile terminal device of a ninth aspect of the present disclosure is a mobile terminal device including a wireless communication circuitry that performs first wireless communication with a communication destination, a wireless communication circuitry that performs second wireless communication with the communication destination, a speed of the second wireless communication being higher than a speed of the first wireless communication, a storage that stores content, and a display that before first content is downloaded from the communication destination through the second wireless communication, displays information on whether second content stored in the storage should be uploaded to the communication destination.

According to a mobile terminal device of a tenth aspect of the present disclosure, in the mobile terminal device of the ninth aspect, if free space of the storage is smaller than a volume of the first content, the display displays information on whether the second content should be uploaded to the communication destination.

The present disclosure can be realized by software, hardware, or software in cooperation with hardware.

Each functional block described in each embodiment can be partly or entirely realized by an LSI such as an integrated circuit, and each process described in each embodiment may be controlled partly or entirely by the same LSI or a combination of LSIs. The LSI may consist of individual chips or consist of one chip so as to include a part or all of the functional blocks. The LSI may include data input and output coupled thereto. The LSI here may be referred to as an IC, a system LSI, a super LSI, or an ultra LSI depending on the difference in the degree of integration.

The technique of implementing an integrated circuit is not limited to the LSI and may be realized by using a dedicated circuit, a general-purpose processor, or a special-purpose processor. In addition, a FPGA (Field Programmable Gate Array), which can be programmed after the manufacture of the LSI, or a reconfigurable processor, in which the connections and the settings of circuit cells disposed inside the LSI can be reconfigured, may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be applied to mobile communication systems.

What is claimed is:

1. A content delivery system comprising:
a server device; and
a client device, wherein
the client device comprises:
a low-speed wireless communication unit that performs wireless communication in accordance with a low-speed communication standard;
a high-speed wireless communication unit that performs wireless communication in accordance with a high-speed communication standard; and
a storage that is coupled to the low-speed wireless communication unit and to the high-speed wireless communication unit,
the server device comprises:
a low-speed wireless communication unit that performs wireless communication in accordance with the low-speed communication standard;
a high-speed wireless communication unit that performs wireless communication in accordance with the high-speed communication standard, a speed of the wireless communication performed by the low-speed wireless communication unit of the server device being lower than a speed of the wireless communication performed by the high-speed wireless communication unit of the server device; and
a storage that is coupled to the low-speed wireless communication unit and to the high-speed wireless communication unit of the server device and that has a larger capacity than a capacity of the storage of the client device,
the server device transmits to the client device a content list through the low-speed wireless communication unit of the client device,
the client device selects first content based on the content list,
the client device calculates free space required to download the first content,
the client device transmits to the server device control information about download of the first content through the low-speed wireless communication unit of the client device,
the client device detects a high-speed communication area based on a signal detected using the high-speed wireless communication unit of the client device,
when free space of the storage of the client device is smaller than a volume of the first content, the client device selects second content stored in the storage of the client device and uploads the second content through the high-speed wireless communication unit of the client device and then downloads the first content through the high-speed wireless communication unit of the client device,
the server device receives from the client device the control information on the download of the first content through the low-speed wireless communication unit of the server device,
the server device detects the high-speed communication area based on a signal detected using the high-speed wireless communication unit of the server device, and
when the second content is uploaded from the client device the server device temporarily stores the second content in the storage of the server device and then downloads the first content to the client device through the high-speed wireless communication unit of the server device.

2. The content delivery system of claim 1, wherein the low-speed wireless communication unit of the client device communicates using microwave communication.

3. The content delivery system of claim 1, wherein the high-speed wireless communication unit of the client device communicates using millimeter-wave communication.

4. A content delivery method performed by a server device and a client device, the method comprising:
transmitting to the client device, by the server device, a content list,
selecting based on the content list, by the client device, first content,
calculating, by the client device, free space required to download the first content,
transmitting to the server device, by the client device, control information about download of first content in accordance with a low-speed wireless communication standard;
detecting, by the client device, a high-speed communication area based on a detected signal;
when free space of a first storage of the client device is smaller than a volume of the first content, uploading to the server device, by the client device second content stored in the first storage in accordance with a high-speed wireless communication standard, a speed of communication in accordance with the low-speed wireless communication standard being lower than a speed of communication in accordance with the high-speed wireless communication standard;
when the second content is uploaded from the client device, temporarily storing, by the server device, the second content in a storage of the server device and then downloading the first content to the client device in accordance with the high-speed wireless communication standard; and downloading, by the client device, the first content in accordance with the high-speed wireless communication standard.

5. The content delivery method of claim 4, wherein the low-speed wireless communication standard relates to microwave communication.

6. The content delivery method of claim 4, wherein the high-speed wireless communication standard relates to millimeter-wave communication.

7. A mobile terminal device comprising:
a low-speed wireless communication unit that performs wireless communication with a communication destination in accordance with a low-speed communication standard;
a high-speed wireless communication unit that performs wireless communication with the communication destination in accordance with a high-speed communication standard, a speed of the wireless communication in accordance with the high-speed communication standard being higher than a speed of the wireless communication in accordance with the low-speed communication standard;
a storage that is coupled to the low-speed wireless communication unit and to the high-speed wireless communication unit and that stores content; and
a display that is coupled to the low-speed wireless communication unit, to the high-speed wireless communication unit, and to storage, and that before first content is downloaded from the communication destination in accordance with the high-d wireless communication unit, displays information on whether second content stored in the storage is uploaded to the communication destination.

8. The mobile terminal device of claim 7, wherein when free space of the storage is smaller than a volume of the first content, the display displays information on whether the second content is uploaded to the communication destination.

* * * * *